Nov. 3, 1964 F. Z. DAUGHERTY 3,154,968
ROTARY ACTUATOR MECHANISM
Filed May 26, 1961
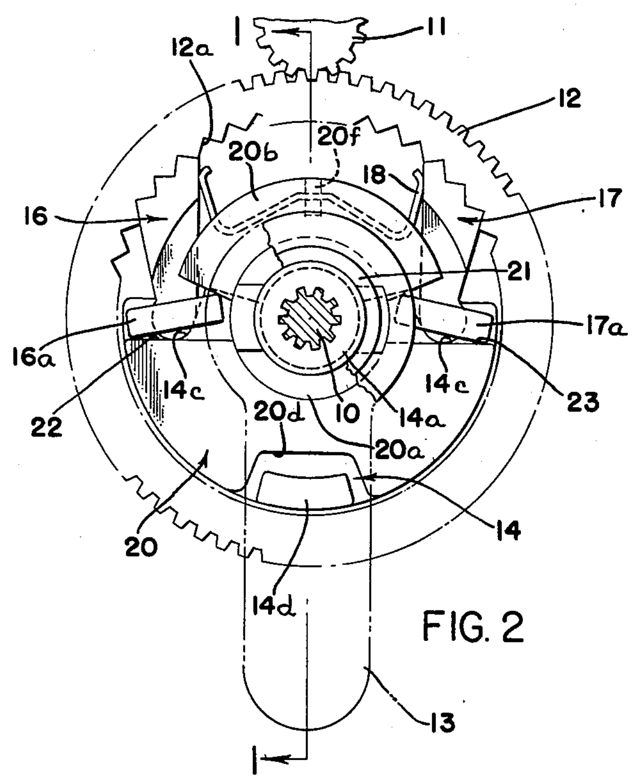
FIG. 2
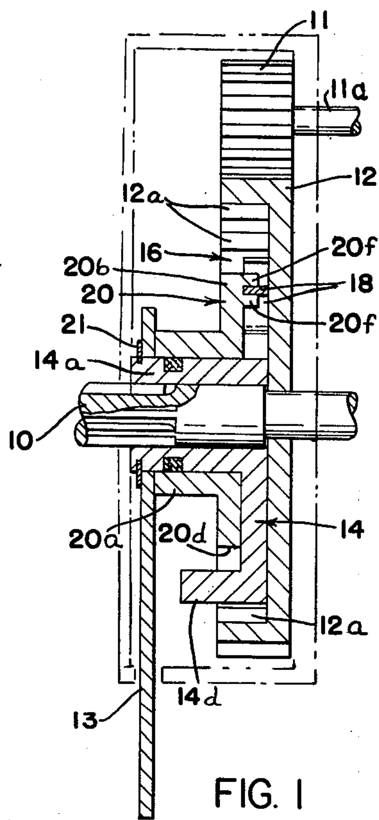
FIG. 1
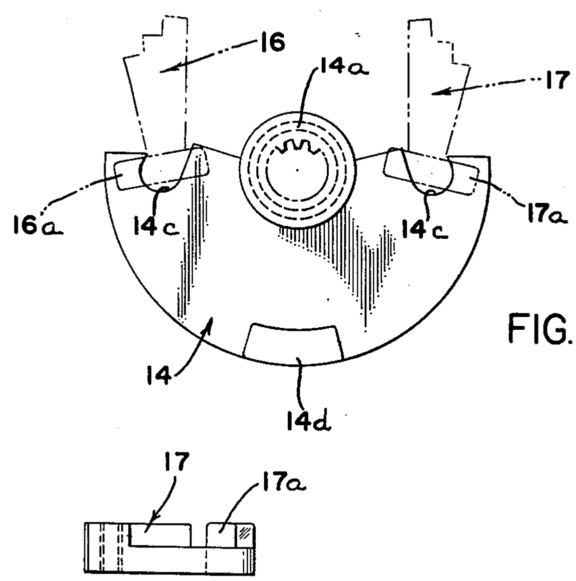
FIG. 3
17
17a
FIG. 4
INVENTOR.
FRANK Z. DAUGHERTY
BY
Williams, Tilbury & Golrick
ATTORNEYS

United States Patent Office 3,154,968

Patented Nov. 3, 1964

3,154,968

ROTARY ACTUATOR MECHANISM

Frank Z. Daugherty, Kent, Ohio, assignor to Ametek, Inc., a corporation of Delaware Filed May 26, 1961, Ser. No. 113,023

11 Claims. (Cl. 74—625)

The present invention is concerned generally with a rotary actuator mechanism for a valve or other device the operation of which involves an applied rotational movement; and particularly with a motor driven rotary actuator including a clutch mechanism permitting manual operation of the driven device independently of the motor driving means.

In motor driven actuators for the operation of various rotationally actuated devices, such for example as valves, it is often desirable to include means permitting easy manual operation of the device for testing or adjusting purposes or under such circumstances as power or mechanical failure and the like. Essentially there is required a mechanism which, upon manual application of operating torque, provides a release of the motor drive mechanism from the operated device. Where an electric motor is the actuating power source, with a large ratio gear speed reduction train or system between the motor and operated device, this is particularly and usually desired since otherwise a relatively great manually applied torque would be required to set the operated device.

Various rotary actuator devices of the type here generally described are known to the prior art, which include means for manual operation of a rotary output shaft and a clutch or release mechanism between a final stage of a gear reduction unit and the actuating output shaft, the latter being normally engaged for driving in either direction from one to another position, but releasable upon application of torque through the manual operating means to permit rotation of the shaft independently of the motor gear reduction drive train.

The present invention provides a novel combination of elements for the attainment of the purposes above described. It comprises a driving gear element rotatably mounted coaxially of an output shaft of the actuator unit having an internal circumferential series of serrations or teeth, means secured to an output shaft providing pivotal pawl seats, and a pair of oppositely disposed pawls seated therein having respective end formations normally biased to engage in the serrations. Such mechanism then provides a positive drive of the output shaft by the driving gear element. Further there is provided a manually operated clutch control element mounted coaxially relative to the output shaft having a lost motion connection relative to the output shaft for movement of the output shaft in either rotational direction. The control element has shoulders or slot formations engageable with lugs or lever portions on the pawls adapted upon rotation of the control element in either direction to release positively a corresponding one of the pawls from the serrations. This arrangement permits an initial free movement of the control member for disengagement of the pawls from the driving gear train, and thereafter a connection of the control element in positive driving engagement with the output shaft.

A primary object of the present invention is to provide, in a device of the character described, a manually releasable positive mechanical engagement between the final stage of a power driving section of an actuator and an actuator output shaft. Another object of the present invention is to provide a positive mechanical engagement between a power driving system and an output shaft in a rotary actuator unit, which is releasable through a manually operated control element for positive mechanical engagement and operation of the output shaft by the control element through a lost motion connection. A still further object is to provide a rotary actuator mechanism with manual override affording improved positioning of an output element when shifted either manually or by power. Other objects and advantages will appear from the following description of one embodiment of the invention, and the drawings wherein:

FIG. 1 is a longitudinal or axial section through pertinent parts of a rotary actuator embodying the present invention, taken as indicated by the lines 1—1 in FIG. 2;

FIG. 2 is a left end elevation of the mechanism of FIG. 1 with certain parts broken away;

FIG. 3 is a detailed view of a driven member; and

FIG. 4 is a detail view of a clutch pawl element.

In the drawings showing the basic and essential elements of the present invention as embodied in a rotary actuator unit, there is included a rotary output shaft 10 rotatably supported in a housing (not shown) and engaged or adapted to be engaged in a rotational driving connection with a rotary device to be actuated, such for example, as a valve operated by rotation of the valve stem from one position to another; an electric motor driven reduction gear train supported (not shown) by the actuator housing and including as a last stage a driving pinion 11 on a motor unit shaft 11*a* and meshed with a gear 12 having one face recessed to accommodate at least in part a clutch mechanism adapted for a normally positive driving engagement with respect to the output shaft 10 whereon it is coaxially rotationally mounted; said clutch mechanism as hereinafter described being adapted for rotation of the output shaft, in a condition released from the motor driven reduction gear mechanism by a handle 13.

The clutch mechanism further includes a driven clutch member 14 having an approximately semi-circular disk or plate portion disposed against the flat bottom or radial face of a recess in the gear member 12 and joined to an enlarged portion of the output shaft 10 by an integral sleeve or hub-like portion 14*a* brazed or otherwise rotationally secured to the output shaft.

At diametrically opposite locations on the member 14 there are provided roughly semi-circular seats 14*c* spaced at like radial distances from the axis of the system, in which arcuate pivotal portions of respective pawl members 16, 17, of radii corresponding to those of the seats, are received and retained under the force of spring 18 and against any withdrawing forces acting in a direction lying in the plane of pawl rotation. At the inner side each seat is carried out in a tangential surface providing a pawl stop shoulder. Each pawl opposite the seated portions has a toothed or serrated end adapted to mesh with or engage with a series of serrations or teeth 12*a* on the internal wall of the recessed face of gear 12. As pawl biasing means, a symmetrical spring or resilient element 18 is disposed between the pawl members with opposite legs bearing on respective pawls to bias the same into engagement with said internal circumferential series of teeth or serrations 12*a*; the spring being held in proper location by insertion of its central portion between the two spaced lugs 20*f* integral with and projecting from the back face of the control member 20.

A clutch actuating or control plate 20 having an integral sleeve or hub portion 20*a* telescoped on and rotationally mounted relative to the hub 14*a* of the driven clutch member serves with the radial wall of the gear member 12 to enclose and retain therebetween the disk portion of the element 14, the spring 18 and also the pawls 16 and 17.

A pair of flats is milled across the end of hub portion 20*a* to a depth equal to the thickness of handle 13 forming a diametric pair of end projections; and the handle 13, apertured to fit over the hub portion 14*a* against the flats and receiving the projections so formed, is secured in such relation by a snap ring 21 engaged in a circumferential external groove of the hub portion 14*a* as appears in FIG. 1.

Diametrically opposed notches in the member 20, providing shoulders 22, 23, embrace the axially projecting or extending levers or lugs 16*a*, 17*a* on the respective pawls, while the opposite ends of the upper portion 20*b* of member 20, having reduced radii, overlap and retain intermediate portions of the pawls 16, 17 of reduced thickness. The lower edge of the member 20 (see FIG. 2) is recessed or notched at 20*d* to accommodate a lug or projection 14*d* axially extending from driven or output member 14; and has roughly radially extending shoulders in spaced relation to corresponding shoulders on the lug 14*d* providing for a lost motion connection between the element 20 and the element 14 and therefore the output shaft 10.

The elements as viewed in FIG. 2 are symmetrically arranged with respect to a vertical longitudinal plane, the pawls 16 and 17 being mirror images of each other. Pawl lug embracing slots 22, 23, in width are oversized with respect to the thickness of the pawl lugs; and with the pawls in fully engaged driving disposition, as seen in FIG. 2, the lugs are obliquely disposed relative to an axial plane of the system, i.e., to the radial length of each slot. In this condition, the outer ends are proximate to and bear on the longer lower approximately radial shoulders 22, 23 on the lower portion of 20; and the inner ends of the lever lugs are proximate to the upper shoulders provided on the radially shorter top portion 20*b* of the control member, thus providing cooperating means on the control member and lugs for positive release of at least a respective pawl for each direction of handle rotation.

Hence, say upon clockwise rotation of the control member through the lever, as permitted by the lost motion between 20*d* and 14*d*, the lower shoulder of slot 22 bearing on the outer end of the pawl lug 16*a* causes the latter to be positively swung out of engagement with the serrations against the bias of spring 18, so that when the wall or shoulder of notch 20*d* encounters the lug 14*d* for positive engagement between the control member and output member, the output shaft has already been released from the gear reduction drive system. Since the pawl 17 would be free to ratchet as 14 is positively advanced or driven in clockwise direction by engagement between the notch and shoulder at 14*d* and 20*d*, it is generally unnecessary to have a positive disengagement of pawl 17. However, to avoid the noise of ratcheting, as is sometimes advantageous, the notch shoulder on the upper portion 20*b* of the control member is here shown as adapted to engage the inner end of pawl lug 17*a* for attaining positive disengagement here also. For opposite motion of the handle 13, the reverse operations or relations are present.

Thus there is disclosed an override mechanism further advantageously providing: a positive drive by the motor with an automatic release from the motor upon manual actuation; an arrangement of the control member and latching pawls relative to the output shaft which is not subject to binding, as in some prior mechanisms, due to misalignment of the output shaft with the rotational input member of a driven device; and in the specific form shown a double pawl mechanism which avoids ratcheting noise upon manual operation; and further a compact arrangement of parts, simple in structure but mutually self-retaining once inserted and enclosed by housing walls adjacent the opposite ends of the members 12 and 14*a*.

I claim:

1. In a rotary actuator having a drive motor unit providing power for a rotary output shaft adapted to be connected to an actuated device, a manual override mechanism comprising: an output shaft; a member rotatably mounted on the output shaft and drivable by a shaft of the motor unit, said member including an annular flange provided with an internal circumferential series of serrations coaxial with the output shaft; means fixed on the output shaft within the annular flange forming a spaced pair of pawl seats equi-spaced radially from the shaft; a pair of pawls pivotally seated in respective seats extending toward the flange; means normally biasing the free ends of the pawls into contact with the serrations; the pawls being adapted under the bias of the last said means for a driven engagement with said serrations, one upon rotation of said member in one direction and the other upon rotation in the other direction; a manually rotatable control member mounted for rotation coaxially of said output shaft; cooperating means on said control member and on the respective pawls adapted to release positively upon manual rotation of the control member in opposite directions a respective one of said pawls which would tend to drive the first said member; and lost motion connection means between said output shaft and control member.

2. A mechanism as described in claim 1, with said cooperating means adapted to release positively both said pawls upon rotation of the control member in either direction and thereby avoid pawl ratcheting.

3. A mechanism as described in claim 1, wherein a flat-bottomed recess is formed on the first said member by said flange; the first said means is a plate-like element, and said pawls inward from the free ends have respective portions no thicker than the plate-like element; and said control member includes parts overlaying the respective pawls to retain the same from displacement axially from said seats.

4. A mechanism as described in claim 1, wherein said pawls have pivot portions engaged in said seats and said seats have arcuate shapes of corresponding radii mutually adapted to retain said pawls in seated arrangement under the force of said biasing means and against any forces arising tending to withdraw the pawls in a direction lying in the plane of pawl rotation.

5. A mechanism as described in claim 3, wherein the biasing means comprises a bow formed leaf spring between said pawls with opposite ends bearing on opposed surfaces of the pawls, and a portion of said control member also overlies said spring and is provided with spring-locating means engaging the central part of said spring.

6. A mechanism as described in claim 1, wherein the free end of each pawl is provided with a plurality of serrations complementary to the first said serrations.

7. A mechanism as described in claim 6, wherein the circumferential serrations approximate a 45° triangular tooth form as closely as permitted by the number of teeth.

8. A mechanism as described in claim 1, wherein the first said member comprises an external gear forming part of a positive gearing connection to the motor shaft.

9. A mechanism as described in claim 1, wherein said lost motion connection means comprises a pin and notch connection between said control member and first said means.

10. In a rotary actuator having a drive motor unit providing power for a rotary output shaft adapted to be connected to an actuated device, for operation of the same in either rotational direction, a manual override mechanism comprising: an output shaft; a disk-like member rotatably mounted on the output shaft and positively mechanically connected to a shaft of the motor unit, said member including an annular flange provided with an internal circumferential series of teeth coaxial with the output shaft; a sector plate fixed on the output shaft within the annular flange having a pair of pawl seats symmetrically located relative to the shaft on respective radial edges thereof; a pair of pawls pivotally seated in respective seats extending toward the flange; the free ends of the pawls being adapted for a driven engagement with said teeth, one upon rotation of said member in one direction and the other upon rotation in the other direction; spring means interposed between and normally biasing the free ends of the pawls into engagement with the teeth; a manually rotatable control plate mounted for rotation coaxially of said output shaft within said flange and overlaying said sector plate and at least portions of said pawls and spring in a retaining relation; said control plate having like openings therethrough corresponding in location to said seats providing respective shoulders, said pawls having respective actuating lugs in said openings cooperating with respective shoulders for pivoting to disengaged position upon manual rotation of the control plate in opposite directions a respective pawl which would tend to drive said member; and lost motion connection means between said output shaft and control member.

11. A mechanism as described in claim 10, wherein said lost motion connection comprises an axially projecting lug on the sector plate and an opening in the control plate providing opposed lug engaging shoulders in normally spaced relation to said lug.

References Cited in the file of this patent

UNITED STATES PATENTS

| | | |
|---|---|---|
| 1,162,253 | Richard | Nov. 30, 1915 |
| 2,420,552 | Morrill | May 13, 1947 |
| 2,599,880 | Wilson | June 10, 1952 |